3,088,978
Patented May 7, 1963

3,088,978
CATALYTIC HYDROGENATION OF 2,4-DINITRO-
PHENYLAMINES
Walter H. Brunner, Easton, Pa., and Alexander Halasz,
Stamford, Conn.
No Drawing. Filed Sept. 12, 1960, Ser. No. 55,136
13 Claims. (Cl. 260—580)

This invention relates to the catalytic hydrogenation of 2,4-dinitrophenylamines for the preparation of the corresponding 2-nitro 4-amino phenylamines.

Processes for the reduction of various dinitro aromatic compounds to amines or the acid addition salts of the amines are known in the art and include various techniques of catalytic hydrogenation or reduction by the use of sulfides, polysulfides, zinc, iron, tin or stannous chloride. However, the prior art methods are poorly suited for the conversion of 2,4-dinitrophenylamines, and particularly those wherein the amino group is the primary or a secondary amine to the corresponding 2-nitro 4-amino phenylamines since they suffer from a number of defects, including: (a) selectivity in reducing the nitro radical in the 2-position instead of the nitro radical in the 4-position; (b) reducing both nitro groups simultaneously; (c) recovery or separation difficulties of the isomeric 2-nitro and 4-nitro derivatives from the reaction mixture and from each other; and (d) very low yields of the 2-nitro 4-amino phenylamines.

It has now been found that 2,4-dinitrophenylamines wherein the amino group is the primary or a secondary amine can be converted to acid addition salts of the corresponding 2-nitro 4-amino phenylamines by an efficient catalytic hydrogenation process. The acid addition salts of the 2-nitro 4-amino phenylamines are then converted to the free base, i.e., acid salt free form, of the phenylamines by the conventional techniques known in the art. The process of the invention comprises the step of first hydrogenating a 2,4-dinitrophenylamine by introducing hydrogen into a mixture of: (a) a dispersion of the 2,4-dinitrophenylamine in an organic polar solvent; (b) a catalytically effective quantity of a platinum group metal hydrogenation catalyst; and (c) a sufficient quantity of an aqueous solution of an acid to give the mixture a pH of less than about 4 wherein the acid employed has a dissociation constant greater than $1 \times 10^{-3}$. The hydrogenation produces the acid addition salt of the corresponding 2-nitro 4-amino phenylamine. To recover the 2-nitro 4-amino phenylamine free of the acid addition salt the conventional techniques of neutralizing and freeing the acid to recover the free base can be employed.

The process of the invention possesses many advantages over the prior art processes for producing 2-nitro 4-amino phenylamines from the corresponding 2,4-dinitrophenylamines. Thus, in the process of this invention the nitro group in the 4-position is selectively reduced instead of the nitro group in the 2-position. In contrast with this, the nitro group in the 2-position is reduced when the phenylamine is a tertiary amine instead of the primary or secondary amine. By ceasing the reaction before too great an excess of hydrogen from that required to reduce one nitro group has reacted with the dinitro compound little or no by-products are produced; the product is easy to recover from the reaction mixture; good yields are obtained; and the product can be easily recovered in a high state of purity.

The 2,4-dinitrophenylamine reactant employed in this invention can be represented by the following generic formula:

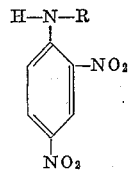

wherein R can be hydrogen, a hydrocarbon radical such as one containing from 1 to about 12 carbon atoms free of olefinic or acetylenic unsaturation, or a hydroxy substituted hydrocarbon radical such as one containing from 1 to about 12 carbon atoms and which is free of olefinic or acetylenic unsaturation. The hydrocarbon radical is preferably one having from 1 to 6 carbon atoms. Illustratively, R can be hydrogen; an alkyl radical, e.g., methyl, ethyl, propyl, isopropyl, butyl, t-butyl, hexyl, dodecyl and the like; a hydroxy substituted alkyl radical such as the hydroxymethyl, 2-hydroxyethyl, 3-hydroxypropyl, 2,3-dihydroxypropyl, 4-hydroxybutyl, 6-hydroxyhexyl, and the like; aryl such as the phenyl; hydroxyaryl such as p-hydroxyphenyl, m-hydroxyphenyl, 3,4-dihydroxyphenyl and the like; alkaryl such as tolyl, 3,4-dimethylphenyl and the like; phenalkyl such as benzyl, phenethyl and the like; cycloalkyls such as the cyclohexyl; and the lower alkyl substituted or hydroxy substituted cycloalkyls such as 4-methylcyclohexyl, 3-hydroxycyclohexyl and the like. The hydroxy substitutent can be monohydroxy substituent or polyhydroxy substituents such as in dihydroxyalkyls.

Illustrative of specific 2-nitro 4-amino phenylamines produced by the reduction of the corresponding 2,4-dinitrophenylamines by the process of this invention there can be mentioned:

(1) 2-nitro 4-amino aniline:

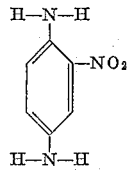

(2) 2-nitro 4-amino N-methyl aniline:

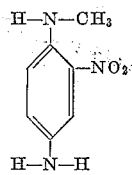

(3) 2-nitro 4-amino N-cyclohexyl aniline:

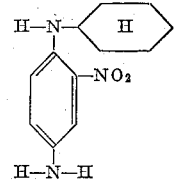

(4) 2-nitro 4-amino N-phenyl aniline:

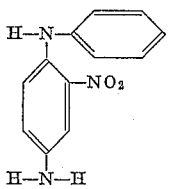

and (5) 2-nitro 4-amino N-(2-hydroxyethyl) aniline:

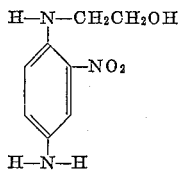

In addition to the above illustrated compounds there can also be mentioned: 2-nitro 4-amino N-ethyl aniline; 2-nitro 4-amino N-propyl aniline; 2-nitro 4-amino N-isopropyl aniline; 2-nitro 4-amino N-(t-butyl) aniline; 2-nitro 4-amino N-(n-heptyl) aniline; 2-nitro 4-amino N-(n-decyl) aniline; 2-nitro 4-amino N-(p-methylcyclohexyl) aniline; 2-nitro 4-amino N-(p-hydroxycyclohexyl) aniline; 2-nitro 4-amino N-(2,3-dihydroxycyclohexyl) aniline; 2-nitro 4-amino N-hydroxymethyl aniline; 2-nitro 4-amino N-(3-hydroxypropyl) aniline; 2-nitro 4-amino N-(2,3-dihydroxypropyl) aniline; 2-nitro 4-amino N-(4-hydroxybutyl) aniline; 2-nitro 4-amino N-(6-hydroxyhexyl) aniline; 2-nitro 4-amino N-(p-hydroxyphenyl) aniline; 2-nitro 4-amino N-(3,4-dihydroxyphenyl) aniline; 2-nitro 4-amino N-tolyl aniline; 2-nitro 4-amino N-(3,4-dimethylphenyl) aniline; 2-nitro 4-amino N-(phenethyl) aniline; 2-nitro 4-amino benzyl aniline and the like.

The acid employed to adjust the acidity to that of less than a pH of about 4 can be strong organic or inorganic acid such as one which has a first dissociation constant greater than about $1 \times 10^{-3}$, e.g., $1 \times 10^{-1}$. Illustrative of such acids there can be mentioned: hydrochloric, sulfuric, phosphoric and various aryl sulfonic acids, e.g., toluene sulfonic acid and the like. Inorganic acids and particularly sulfuric acid are preferred. Sulfuric acid is particularly advantageous because the sulfate acid addition salts of the hydrogenated compounds are ordinarily insoluble in the reaction medium and easy to recover. It has been found that some water must be present for the hydrogenation reaction to proceed. The quantity of water is not critical, but should be less than about 40% and preferably from about 1% to about 25% by weight of the initial reaction mixture. Ordinarily the water is supplied by the aqueous solution of the acid although it can be added separately to the reaction mixture.

The reaction time, or time required to conduct the hydrogenation is not critical and deepnds on the quantities of reactants, reaction conditions, such as temperature, and the rate of hydrogen feed. Illustratively, the reaction can be performed in times varying from one minute to over four or five hours, but preferably the reaction times varies from about five minutes to about two hours.

The solvent for the 2,4-dinitrophenylamine reactant can be any polar organic solvent, free from olefinic or acetylenic unsaturation, such as various alcohols, organic acids, and dialkylformamides. Illustrative of polar organic solvents there can be mentioned: monohydric or polyhydric alcohols such as alkanols, e.g., methanol, ethanol, 3-propanol, 4-butanol, various pentanols and the like; dihydric alkyl alcohols such as propylene glycol; trihydric alcohols such as glycerine; acids such as acetic acid; and dialkylformamides such as dimethylformamide. It is preferred that the polar organic solvent have less than 5 carbon atoms and particularly from 1 to 3 carbon atoms such as ethanol. The quantity of solvent employed for the dinitrophenylamine reactant is not critical since it is only required to dissolve all or even only a portion of the dinitro reactant. Thus, quantities less than that required to solubilize all of the dinitro compound can be employed so as to form a slurry. The term dispersion is used in this application to denote both complete or partial solution of the dinitro compound with the solvent. Of course, quantities of the polar organic solvent in excess of that required to solubilize the dinitro compound can also be employed such as from 2 to 10 times the required amount although this is expensive and serves no useful purpose.

The catalyst can be any platinum metal hydrogenation catalyst such as platinum or palladium. The concentration of the hydrogenation catalyst is not critical. Illustratively, the concentration of the catalyst can vary from that of less than about .05% by weight, based on the dinitro reacant, to that of more than about 10%. For economic considerations and convenience it is preferred that the catalyst vary from about 0.1% by weight, to that of about 3%, by weight, based on the quantity of the dinitro reacant. The catalyst can be supported on inert materials in the conventional manner of hydrogenation procedures and these inert materials include alumina, charcoal, kieselguhr, and the like.

As mentioned previously, the quantity of acid employed is not critical provided the initial pH of the reaction mixture is less than about 4, and preferably less than about 3; however, for maximum yields or economy it is preferred that the molar quantity of the particular acid employed based on the dinitro compound vary from about 1:2 to about 4:1 moles, and particularly about 2:1.

The quantity of hydrogen which is reacted with the dinitro reactant is preferably the stoichiometric quantity of hydrogen required to reduce one of the nitro groups, i.e., 3 moles of hydrogen per mole of the dinitro reactant, so as to produce high yields of only the 2-nitro 4-amino phenylamine product. The hydrogenation can be easily controlled by permitting the reaction mixture to absorb the stoichiometric quantity of hydrogen required to reduce one of the nitro groups. Smaller or greater quantities of hydrogen than the stoichiometric quantity can be reacted although with the smaller quantities, e.g., 1 mole of hydrogen per mole of the dinitro compound, only a small portion of the dinitro compound will be reduced to the corresponding 2-nitro 4-amino phenylamine. The larger quantities of hydrogen, such as 4 moles per mole of the dinitro reacant will reduce some of the unreacted nitro radical in the 2-position of the 2-nitro 4-amino phenylamine product.

The temperature of the reaction can vary over wide limits such as that of about 0° C. to about 90° C. and preferably from about 25° C. to about 65° C. Pressures are not critical and can vary from subatmospheric to that of over 10 atmospheres. Pressures which are in excess of atmospheric pressure are preferred. Again due to convenience and economic considerations it is preferable to employ pressures of about 17 p.s.i. to about 100 p.s.i. and particularly pressures of about 20 p.s.i. to about 70 p.s.i. Also, it is preferred to conduct the reaction in the liquid phase.

The general procedure for practicing the process of this invention is to charge the catalyst, aqueous solution of the acid, and a warm dispersion of the 2,4-dinitrophenylamine in the polar organic solvent, into an autoclave. The autoclave is then closed, and its contents are heated to the desired temperature. Gaseous hydrogen is then introduced into the reaction mixture at the desired temperature and pressures in excess of atmospheric pressure. It is preferred to shake or stir the autoclave contents during the hydrogenation. After a sufficient quantity of hydrogen has been introduced into the mixture, the hydrogen feed is discontinued and the reaction mixture is permitted to cool. The acid addition salt of the 2-nitro 4-amino phenylamine product is then recovered from the reaction mixture by procedures well known to those skilled in the art and include fractional distillation, extraction, extractive distillation, precipitation, or combinations of two or more of these methods. It is also possible to first neutralize or react the product with a base prior to separation from the reaction mixture in order to obtain the salt free product of the 2-nitro 4-amino phenylamine. Of course, the method of recovery of the acid addition salt of the phenylamine product will depend on whether the salt is soluble or insoluble in the reaction mixture. When the acid addition salt of the 2-nitro 4-amino phenylamine product is insoluble in the cooled reaction mixture, the reaction mixture is filtered to recover both the catalyst and acid addition salt. The salt is then dissolved in a suitable solvent such as hot water and the mixture filtered to separate the solid catalyst from the salt. The free base form of the product is then obtained by reacting the salt product with a base in the conventional manner of freeing an amine from its acid addition salt which is usually accomplished by adding a base. When the product of the hydrogenation is soluble in the reaction mixture, the catalyst is filtered off, the bulk of the alcohol is removed by distillation and the residue, which contains the acid salt can be alkalized with an aqueous solution of a base and the product which separates, i.e., the 2-nitro 4-amino phenylamine, can be filtered off as a residue.

It is not necessary to separate the acid addition salt from the 2-nitro 4-amino phenylamine base since both the acid addition salts and the free base form of the 2-nitro 4-amino phenylamines have utilities in common such as their use as hair dyes or intermediates for producing other dyes. When used as hair dyes, they can be formulated and used by the conventional techniques used in the dyeing art. Illustratively, a composition for dyeing living human hair can be produced by forming an aqueous solution containing, by weight, about 1% of one of the 2-nitro 4-amino phenylamines, such as 2-nitro 4-amino N-methyl aniline, and adding a sufficient quantity of an alkalizing agent, such as ammonia, to the aqueous solution to bring the pH of the composition to about 11. A small amount of ethanol can be admixed with the nitro compound to increase its solubility. This composition then can be used to color the hair by saturating the hair and scalp with the composition for a period of about 20 minutes at room temperature.

The following examples are illustrative of the invention:

EXAMPLE 1

*Reduction of 2,4-Dinitroaniline to 4-Amino-2-Nitroaniline*

One gram of 5% platinum on charcoal catalyst, 20 ml. of concentrated (about 38%) hydrochloric acid, and a warm solution (about 35° C.) of 18.3 grams (0.1 mole) of 2,4-dinitroaniline in 200 ml. of ethanol (96% ethanol content) were charged to an autoclave. The autoclave and its contents were heated to a temperature of 60° C. to 65° C. and maintained at this temperature while 0.605 gram of hydrogen (0.3 mole) was introduced into the autoclave, under constant shaking, at a pressure of 50 p.s.i. to 30 p.s.i. The quantity of hydrogen introduced into the autoclave corresponded to the theoretical quantity of hydrogen necessary for reducing one of the nitro groups. The reaction product dissolved in the reaction mixture as it was formed. After cooling the reaction mixture to room temperature the catalyst was filtered off, the bulk of alcohol was removed by distillation, the residue which contained the hydrochloride salt of the 4-amino-2-nitroaniline product was alkalized with aqueous ammonia solution, and cooled down to room temperature. The resulting crystals of 4-amino-2-nitroaniline were filtered off and dried to obtain a yield greater than 70% of theory.

EXAMPLE 2

*Reduction of N-Methyl 2,4-Dinitroaniline to 2-Nitro 4-Amino N-Methyl Aniline*

In a hydrogenation apparatus there were charged 0.5 grams of 5% platinum on charcoal, a mixture of 9.9 grams (0.05 mole) of pulverized N-methyl-2,4-dinitro aniline in 200 ml. of ethanol (96% ethanol content) and 20 ml. of concentrated (38%) hydrochloric acid. The reaction mixture was heated to 60° C. and held at this temperature while there was introduced into the reaction chamber, with constant shaking 0.303 gram (0.15 mole) of hydrogen at a pressure of 50 to 40 p.s.i. (over a period of about 30 minutes). After cooling the reaction mixture to room temperature, a mixture of the catalyst and the hydrochloride of the nitroamine separated as yellow crystals. These crystals were filtered off, dissolved in 50 ml. of hot water and the undissolved catalyst filtered off. The filtrate was cooled and the resulting acid addition salt of 2-nitro 4-amino N-methyl aniline which precipitated out of solution was recovered by filtration.

EXAMPLE 3

*Reduction of N-Ethyl 2,4-Dinitroaniline to 2-Nitro 4-Amino N-Ethyl Aniline*

By following the process described in Example 2 there was hydrogenated 22.0 grams (0.1 mole) of N-ethyl 2,4-dinitroaniline by hydrogenating with 0.605 grams of hydrogen (0.3 mole). From the resulting hydrochloride salt of N-ethyl 2-nitro 4-amino aniline the free base was prepared by neutralization with sodium carbonate.

EXAMPLE 4

*Reduction of N-Phenyl-2,4-Dinitroaniline to 2-Nitro 4-Amino N-Phenyl Aniline*

Into a hydrogenation apparatus there was charged 0.2 gram of platinum on charcoal (5%) 2 ml. of water, 20 ml. of isopropanol, 13.2 g. ($\frac{1}{20}$ mole) N-phenyl 2,4-dinitroaniline, and additional 80 ml. of isopropanol and 20 grams of a 50% aqueous solution of $H_2SO_4$. The temperature of the reaction mixture was brought up to about 65° C. and then there was introduced into the reactor at a pressure of 50 to 40 p.s.i about .303 gram (0.15 mole) of hydrogen over a period of 17 minutes. The temperature of the reaction mixture at the end 17 minute period was 52° C. The reaction mixture was permitted to cool, the autoclave was opened and the sulfate acid addition salt of 2-nitro 4-amino N-phenyl aniline which was produced by the hydrogenation was filtered off as a precipitate. This sulfate salt was subsequently alkalized and separated to obtain the base form of the 2-nitro 4-amino N-phenyl aniline as red crystals.

EXAMPLE 5

*Reduction of N-Phenyl 2,4-Dinitroaniline to 2-Nitro 4-Amino N-Phenyl Aniline*

Into a hydrogenation apparatus there was charged 0.5 gram of a 5% platinum on charcoal catalyst, 10 ml. of concentrated hydrochloric acid (38%), 13 grams ($\frac{1}{20}$ mole) of N-phenyl 2,4-dinitroaniline in 200 ml. of ethanol. The reaction mixture was heated to a temperature of 60° C. to 65° C. and hydrogenated at 50 to 40 p.s.i. After the reaction mixture had absorbed 0.15 mole of hydrogen, the reaction mixture was cooled to room temperature and the reaction mixture was filtered from the catalyst. To the filtrate was added 200 ml. of water and a large excess of sodium bicarbonate. The mixture was permitted to stand for several hours whereupon the reaction product 2-nitro 4-amino N-phenyl aniline crystalized out of solution and was subsequently isolated by filtration.

EXAMPLE 6

*Reduction of N-Hydroxyethyl 2,4-Dinitroaniline to 2-Nitro 4-Amino N-(2-Hydroxyethyl) Aniline*

In a hydrogenation apparatus there was placed: 0.5 gram of 10% palladium on charcoal, 20 ml. of concentrated hydrochloric acid (38%) and a solution of 22.7 grams (1/10 mole) of N-(2-hydroxyethyl) 2,4-dinitroaniline in 150 ml. of ethanol. This reaction mixture was hydrogenated at a pressure of 50 to 30 p.s.i. and a temperature of 60° C. After absorption by the reaction mixture of 0.3 mole of hydrogen, the apparatus was permitted to cool. The yellow hydrochloric acid salt of 2-nitro 4-amino N-(2-hydroxyethyl) aniline was separated from the catalyst by dissolving in hot water.

EXAMPLE 7

*Reduction of N-(2-Hydroxyethyl) 2,4-Dinitroaniline to 2-Nitro 4-Amino N-(2-Hydroxyethyl) Aniline*

A glass lined hydrogenation autoclave was charged with 5 grams of 5% platinum on charcoal catalyst, 20 ml. of water, 300 ml. of isopropanol, 113.5 grams (0.5 mole) of N-(2-hydroxyethyl) 2,4-dinitroaniline and 200 grams of sulfuric acid (50% by weight of $H_2SO_4$). Hydrogen was introduced into the reaction medium at a pressure of 50 p.s.i. and 60° C. After absorption of 1.5 moles of hydrogen, the autoclave was cooled to 25° C.–20° C. This reaction mixture was filtered. The yellow crystals of 2-nitro 4-amino N-(2-hydroxyethyl) aniline which were recovered as a precipitate were crystallized from 1,000 ml. of hot water. After cooling the crystals were converted with aqueous ammonia to the free base.

EXAMPLE 8

*Reduction of N-(2-Hydroxyethyl) 2,4-Dinitroaniline in the Presence of p-Toluenesulfonic Acid*

There was charged into a hydrogenation apparatus, 0.5 g. of platinum on charcoal catalyst, 10 ml. of water, 19 grams of p-toluenesulfonic acid (1/10 mole), 100 ml. of ethanol, and 11.3 grams (1/20 mole) of N-(2-hydroxyethyl) 2,4-dinitroaniline. The reaction mixture was heated to 60° C. and hydrogenated with .303 gram of hydrogen (0.15 mole) under a pressure of 50 to 40 p.s.i. over a ten minute period. The reaction mixture was then cooled and filtered.

EXAMPLE 9

*Reduction of N-(2-Hydroxyethyl) 2,4-Dinitroaniline in the Presence of Phosphoric Acid*

In an autoclave there was charged 0.5 gram of platinum on charcoal catalyst, 2 ml. of water, 30 ml. of isopropanol and 11.3 grams (1/20 mole) of N-(2-hydroxyethyl) 2,4-dinitroaniline in 70 ml. of isopropanol, and 30 grams of phosphoric acid. The reaction mixture was hydrogenated by adding .303 gram of hydrogen to the reaction mixture at about 40 to 50 p.s.i. over a period of 16 minutes and a temperature of about 65° C. After the addition of hydrogen the reaction mixture was cooled and the phosphate salt of 2-nitro 4-amino-N-(2-hydroxyethyl) aniline was recovered as a precipitate. The precipitate was recrystallized in 50 ml. of water. This recrystallized phosphate salt was subsequently treated with aqueous ammonia to free the base compound from the acid.

EXAMPLE 10

*Reduction of N-Cyclohexyl 2,4-Dinitroaniline to 2-Nitro 4-Amino N-Cyclohexyl Aniline*

In a hydrogenation apparatus there was charged 0.2 gram of platinum on charcoal (5%), 2 ml. of water, 20 ml. of isopropanol, 13.2 grams of N-cyclohexyl 2,4-dinitroaniline (1/20 mole) 70 ml. of isopropanol and 20 grams of 50% aqueous solution of $H_2SO_4$. Hydrogenated from 50 to 40 p.s.i. over a ten minute period at a temperature of about 50° C. by passing 0.303 gram (0.15 mole) of hydrogen into the reaction mixture to produce the acid addition salt of the 2-nitro 4-amino N-cyclohexyl aniline.

What is claimed is:

1. A process for the catalytic hydrogenation of a 2,4-dinitrophenylamine to an acid addition salt of the corresponding 2-nitro 4-amino phenylamine wherein the amino nitrogen of said 2,4-dinitrophenylamine compound is substituted by at least one hydrogen atom and a member selected from the group consisting of hydrogen, a hydrocarbon radical containing from 1 to about 12 carbon atoms, and a hydroxy-substituted hydrocarbon radical containing from 1 to about 12 carbon atoms wherein the said hydrocarbon radical and hydroxy-substituted hydrocarbon radical are free of olefinic and acetylenic unsaturation, which comprises hydrogenating the 2,4-dinitrophenylamine by introducing hydrogen into a mixture having a temperature of about 0° C. to about 90° C. and containing (a) a dispersion of the 2,4-dinitrophenylamine in a polar organic solvent free from olefinic and acetylenic unsaturation, said 2,4-dinitrophenylamine having the generic formula:

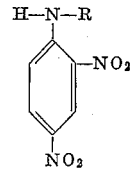

wherein R is a member selected from the group consisting of hydrogen, a hydrocarbon radical free from olefinic and acetylenic unsaturation and having from 1 to about 12 carbon atoms, and a hydroxy-substituted hydrocarbon radical free from olefinic and acetylenic unsaturation having from 1 to about 12 carbon atoms; (b) a platinum metal hydrogenation catalyst selected from the group consisting of platinum and palladium; and (c) an aqueous solution of an acid having a dissociation constant greater than about $1 \times 10^{-3}$, said acid imparting a pH of less than about 4 to the mixture; and ceasing the hydrogenation prior to the complete reduction of both nitro groups of said 2,4-dinitrophenylamine.

2. A process for the catalytic hydrogenation of a 2,4-dinitrophenylamine to the corresponding 2-nitro 4-amino phenylamine wherein the said 2,4-dinitro compound has the generic formula:

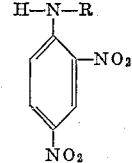

wherein R is a member selected from the group consisting of hydrogen, a hydrocarbon radical having from 1 to about 12 carbon atoms, and a hydroxy-substituted hydrocarbon radical having from 1 to about 12 carbon atoms, and wherein the said hydrocarbon and hydroxy-substituted hydrocarbon radical is free from olefinic and acetylenic unsaturation, which comprises simultaneously hydrogenating and forming an acid addition salt of the corresponding 2-nitro 4-amino phenylamine by introducing hydrogen into a mixture heated to a temperature of about 0° C. to about 90° C. and containing (a) a dispersion of the 2,4-dinitrophenylamine in a polar organic solvent free from olefinic and acetylenic unsaturation, and wherein the molar ratio of the hydrogen reacted with the said 2,4-dinitro compound is less than about 4:1; (b) a metal hydrogenation catalyst selected from the group consisting of platinum and palladium; and (c) an aqueous solution of an acid having a dissociation constant greater than about $1 \times 10^{-3}$, said acid imparting a pH of less than about 3 to the mixture; and finally freeing the 2-nitro-4-amino phenylamine from its acid addition salt by reacting the said salt with a base.

3. A process for the catalytic hydrogenation of a 2,4-dinitrophenylamine to an acid addition salt of the corresponding 2-nitro 4-amino phenylamine wherein the said 2,4-dinitro compound has the generic formula:

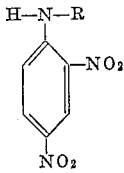

wherein R is a member selected from the group consisting of hydrogen, a hydrocarbon radical having from 1 to 6 carbon atoms free of olefinic and acetylenic unsaturation, and a hydroxy-substituted hydrocarbon radical having from 1 to 6 carbon atoms free of olefinic and acetylenic unsaturation which comprises introducing hydrogen into a liquid mixture wherein about 3 moles of hydrogen are introduced for each mole of the 2,4-dinitro compound; and wherein the liquid mixture is at a temperature of about 0° C. to about 90° C. and comprises; (a) a solution of the 2,4-dinitrophenylamine in an alkanol having from 1 to 5 carbon atoms; (b) a metal hydrogenation catalyst selected from the group consisting of platinum and palladium; and (c) an aqueous solution of an acid having a dissociation constant greater than $1 \times 10^{-3}$, said acid imparting a pH of less than about 3 to the liquid mixture.

4. The process of claim 3 wherein the 2,4-dinitrophenylamine is 2,4-dinitroaniline.

5. The process of claim 3 wherein the 2,4-dinitrophenylamine is N-methyl 2,4-dinitroaniline.

6. The process of claim 3 wherein the 2,4-dinitrophenylamine is N-(2-hydroxethyl) 2,4-dinitroaniline.

7. The process of claim 3 wherein the liquid mixture is at a temperature of about 25° C. to about 65° C. and a pressure of about 1 to about 10 atmospheres and wherein the alkanol has from 1 to 3 carbon atoms and the acid is an inorganic acid selected from the group consisting of hydrochloric acid, sulfuric acid, and phosphoric acid.

8. A process for the catalytic hydrogenation of a 2,4-dinitrophenylamine to the corresponding 2-nitro 4-amino phenylamine which comprises: (1) feeding hydrogen into a mixture containing a 2,4-dinitrophenylamine heated at a temperature of about 25° C. to about 65° C. to form an acid addition salt of the corresponding 2-nitro 4-amino phenylamine wherein the mixture comprises: (a) a solution of an alkanol having from 1 to 3 carbon atoms and a 2,4-dinitrophenylamine having the generic formula:

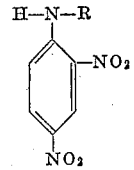

wherein R is a member selected from the group consisting of hydrogen, a hydrocarbon radical having from 1 to 6 carbon atoms free of olefinic and acetylenic unsaturation, and a monohydroxy-substituted hydrocarbon radical having from 1 to 6 carbon atoms free of olefinic and acetylenic unsaturation; (b) a metal hydrogenation catalyst selected from the group consisting of platinum and palladium; and (c) an aqueous solution of an inorganic acid having a dissociation constant greater than $1 \times 10^{-3}$ to give the mixture a pH of less than 3; (2) discontinuing the hydrogen feed when the said 2,4-dinitro phenylamine has been converted to the acid addition salt of the corresponding 2-nitro 4-amino phenylamine; and (3) finally freeing the 2-nitro 4-amino phenylamine from its acid addition salt by reacting the said salt with a base.

9. The process of claim 3 wherein the 2,4-dinitrophenylamine is N-ethyl 2,4-dinitroaniline.

10. The process of claim 3 wherein the 2,4-dinitrophenylamine is N-phenyl 2,4-dinitroaniline.

11. The process of claim 2 wherein R is an alkyl.

12. The process of claim 2 wherein R is a hydroxyalkyl.

13. The process of claim 2 wherein R is hydrogen.

References Cited in the file of this patent

Ellis: Hydrogenation of Organic Substances (pages 264–267), 1930.